(12) United States Patent
Cannon et al.

(10) Patent No.: US 7,155,163 B2
(45) Date of Patent: Dec. 26, 2006

(54) UNIFIED PASSCODE PAIRING OF PICONET DEVICES

(75) Inventors: Joseph M. Cannon, Harleysville, PA (US); Jonathan H. Fischer, Longmont, CO (US); John P. Veschi, Fogelsville, PA (US)

(73) Assignee: Agere Systems Inc., Allentown, PA (US)

( * ) Notice: Subject to any disclaimer, the term of this patent is extended or adjusted under 35 U.S.C. 154(b) by 744 days.

(21) Appl. No.: 09/756,106

(22) Filed: Jan. 9, 2001

(65) Prior Publication Data

US 2002/0090912 A1    Jul. 11, 2002

(51) Int. Cl.
*H04B 7/00* (2006.01)

(52) U.S. Cl. ............ 455/41.2; 455/420; 455/466; 455/456.6; 455/90.1

(58) Field of Classification Search ............ 455/426.1, 455/41.1–41.3, 426.2, 466, 518, 519, 520
See application file for complete search history.

(56) References Cited

U.S. PATENT DOCUMENTS

| | | | |
|---|---|---|---|
| 6,289,218 B1* | 9/2001 | Liu ............................ | 455/426 |
| 6,366,622 B1* | 4/2002 | Brown et al. ............... | 375/322 |
| 6,484,027 B1* | 11/2002 | Mauney et al. ............. | 455/421 |
| 6,571,103 B1* | 5/2003 | Novakov ..................... | 455/464 |
| 6,631,271 B1* | 10/2003 | Logan ....................... | 455/456.1 |
| 6,640,098 B1* | 10/2003 | Roundtree .................. | 455/414.2 |
| 6,697,638 B1* | 2/2004 | Larsson et al. ............ | 455/553.1 |
| 6,718,395 B1* | 4/2004 | Ziegler ........................ | 709/248 |
| 2002/0065041 A1* | 5/2002 | Lunsford et al. ............ | 455/41 |
| 2003/0036350 A1* | 2/2003 | Jonsson et al. ............. | 455/41 |

FOREIGN PATENT DOCUMENTS

WO    WO94/05101    * 3/1994

OTHER PUBLICATIONS

Bluetooth Specification Version 1.0B, Profiles, Bluetooth SIG, Dec. 1, 1999, pp. 37-44.*
Bluetooth Specification Version 1.0 B, pp. 143-162, Nov. 29, 1999.

* cited by examiner

*Primary Examiner*—Charles R. Craver

(57) ABSTRACT

The present invention relates to an application layer function outside the BLUETOOTH protocol which associates a BLUETOOTH unique address, i.e., the 48-bit unique BD_ADDR address, with a short passcode or PIN which is associated with a particular type of BLUETOOTH device in a particular piconet. The passcode or PIN can be predetermined by the manufacturer of the BLUETOOTH device, or can be input and defined by the user. Upon installation in a piconet, in one embodiment shown and described with reference to FIGS. 1 and 2, a user can be asked to manually input a particular passcode or PIN into a relevant piconet device, and an inquiry can be broadcast to all communicating piconet devices and only those other piconet devices having a matching passcode or PIN associated therewith can automatically forward their respective 48-bit unique BD_ADDR addresses to the inquiring piconet device. Alternatively, a user can inquire and be provided with a list of available passcodes or PINs already established by other devices in the piconet, and select a particular passcode or PIN associated with one or more other piconet devices. The passcode or personal identification number (PIN) may be input upon electronic device setup (e.g., a four character code). The passcode or PIN may be numeric, text, or alphanumeric.

14 Claims, 6 Drawing Sheets

UNIFIED PASSCODE PAIRING OF PICONET DEVICES

BACKGROUND OF THE INVENTION

1. Field of the Invention

This invention relates generally to piconet wireless networks. More particularly, it relates to a user friendly configuration of BLUETOOTH™ piconet type networks.

2. Background

Piconets, or small wireless networks, are being formed by more and more devices in many homes and offices. In particular, a popular piconet standard is commonly referred to as a BLUETOOTH™ piconet. Piconet technology in general, and BLUETOOTH technology in particular, provides peer-to-peer communications over short distances.

The wireless frequency of the piconets may be 2.4 GHz as per BLUETOOTH standards, and/or typically have a 20 to 100 foot range. The piconet RF transmitter may operate in common frequencies which do not necessarily require a license from the regulating government authorities, e.g., the Federal Communications Commission (FCC) in the United States. Alternatively, the wireless communication can be accomplished with infrared (IR) transmitters and receivers, but this is less preferable because of the directional and visual problems often associated with IR systems.

A plurality of piconet networks may be interconnected through a scatternet connection, in accordance with BLUETOOTH™ protocols. BLUETOOTH network technology may be utilized to implement a wireless piconet network connection (including scatternet). The BLUETOOTH standard for wireless piconet networks is well known, and is available from many sources, e.g., from the web site www-.bluetooth.com.

With the introduction of BLUETOOTH piconets in many electronic home devices, the configuration or pairing of BLUETOOTH devices becomes increasingly difficult and error prone by the user. This is particularly true where individual BLUETOOTH devices are manufactured by different companies.

FIG. 5 depicts a conventional BLUETOOTH device 500.

In particular, as shown in FIG. 5, a conventional BLUETOOTH device 500 includes a processor or logic device 508 (e.g., a microprocessor, a microcontroller, or a digital signal processor (DSP)), and a BLUETOOTH front end 504. Moreover, the BLUETOOTH device 500 includes a unique 48-bit BD_ADDR 502, and a table 506 containing a list of paired BLUETOOTH devices in the particular piconet. The paired device unique address table 506 may be pre-configured at the factory, or written to by a suitable user interface such as a software-based configuration module 510 allowing entry of the 48-bit address of paired devices for storage in the paired device unique address table 506.

When configuring a BLUETOOTH device in a BLUETOOTH piconet, the devices communicating on the piconet must know the specific unique 48-bit address of matching devices on the piconet. For instance, it may be desirable for entertainment devices (e.g., TV, radio, CD player, DVD player, MP3 player, etc.) having BLUETOOTH communication capabilities to communicate with one another, but it may not be desirable (nor make sense) for appliances such as a stove or refrigerator, toaster, blender, etc. having BLUETOOTH communication capabilities talk with entertainment devices.

This is particularly true since the maximum number of BLUETOOTH devices in a piconet is somewhat restricted. For instance, current BLUETOOTH standards permit one (1) master and seven (7) slaves to be active in the piconet at any one time (plus a number of BLUETOOTH devices being capable of being 'parked').

According to the standard, all BLUETOOTH devices are assigned a unique 48-bit BLUETOOTH device address (BD_ADDR). This address is derived from the IEEE802 standard, and is divided into three fields: a lower address part (LAP) comprising 24 bits; an upper address part comprising 8 bits; and a non-significant address part (NAP) comprising 16 bits. The LAP and UAP form the significant part of the 48-bit BLUETOOTH device address (BD_ADDR). The total address space obtained is $2^{32}$.

The BLUETOOTH device address (BD_ADDR) is unique for each BLUETOOTH device. The BLUETOOTH addresses are publicly known, and can be obtained by a manufacturer via MMI interactions, or, automatically, via an inquiry routine by a BLUETOOTH device. Blocks of 48-bit addresses may be assigned to various manufacturers, who in turn factory pre-configure each BLUETOOTH device to include a unique 48-bit address (BD_ADDR) as well as a table of unique 48-bit addresses of 'paired' devices which will all communicate over a common piconet.

When a user buys or replaces a BLUETOOTH equipped electronic device, the user must configure the new BLUETOOTH device for communication with relevant and desired devices in the relevant piconet. Conventionally, BLUETOOTH communicating devices may be pre-configured at the factory to include the unique 48-bit addresses of one another to allow communications therebetween. However, if a pre-configured device breaks and requires replacement by a user, reconfiguration of the replacement BLUETOOTH device to include the identity of a paired BLUETOOTH device is cumbersome and error prone at best.

FIG. 6 shows a conventional configuration technique for automatically configuring a BLUETOOTH device with paired devices in a piconet.

In particular, as shown in step 602 of FIG. 6, a BLUETOOTH device 500 inquires of other BLUETOOTH devices within range of the piconet and/or scatternet.

In step 604, the unique 48-bit addresses BD_ADDR of all other BLUETOOTH devices of all types are received. This step in particular has the potential of increasing network traffic, degrading communications in general, particularly in a fluent network design such as in mobile applications.

In step 606, a user is required to manually select desired other BLUETOOTH devices from a list of all 48-bit addresses received for pairing with the primary inquiring device.

In step 608, the selected unique 48-bit BLUETOOTH addresses BD_ADDR is/are stored in an appropriate location. e.g., in the paired device unique address table 506 shown in FIG. 5.

While the process shown in FIG. 6 provides automation to the paired BD_ADDR configuration process in a BLUETOOTH device, it nevertheless requires confirmation by the user of which other BLUETOOTH device(s) to accept as a 'paired' device. However, if a significant number of other BLUETOOTH devices are within range (e.g., in a well-implemented home), it becomes burdensome to the user to select which of a great number of possible BLUETOOTH devices should be selected as a paired device.

Currently, each BLUETOOTH device must be configured with the 48-bit unique address of other BLUETOOTH devices in the particular piconet to permit communications therebetween. Unfortunately, this is prone to errors by users. resulting in erroneous or no communications between BLUETOOTH devices, frustrating users and ultimately contributing to a potential slow acceptance of piconet technology.

There is a need for a simplified address configuration technology and apparatus with respect to piconet devices in general, and BLUETOOTH standard devices in particular.

SUMMARY OF THE INVENTION

In accordance with the principles of the present invention, a wireless piconet network device comprises a piconet front end, a unique address, and a passcode or PIN selection module to allow a user to provide a passcode or PIN associated with at least one other wireless piconet network device within range of the wireless piconet network device.

A method of obtaining a unique address pairing between separate wireless piconet network devices in accordance with another aspect of the present invention comprises entering a passcode or PIN into a first wireless piconet network device. Unique addresses of each of a plurality of wireless piconet network devices each associated with said entered passcode or PIN are provided to the first wireless piconet network device. A plurality of piconet network devices in a common piconet network are associated with the single entered passcode or PIN.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to an application layer function outside the BLUETOOTH protocol which associates a BLUETOOTH unique address, i.e., the 48-bit unique BD_ADDR address, with a short passcode or PIN which is associated with a particular type of BLUETOOTH device in a particular piconet. The passcode or PIN can be predetermined by the manufacturer of the BLUETOOTH device, or can be input and defined by the user.

Upon installation in a piconet, In one embodiment shown and described with reference to FIGS. 1 and 2, a user can be asked to manually input a particular passcode or PIN into a relevant piconet device, and an inquiry can be broadcast to all communicating piconet devices and only those other piconet devices having a matching passcode or PIN associated therewith can automatically forward their respective 48-bit unique BD_ADDR addresses to the inquiring piconet device. Alternatively, in an embodiment shown and described with reference to FIGS. 3 and 4, a user can inquire and be provided with a list of available passcodes or PINs already established by other devices in the piconet, and select a particular passcode or PIN associated with one or more other piconet devices.

The passcode or personal identification number (PIN) may be input upon electronic device setup (e.g., a four character code). The passcode or PIN may be numeric, text, alphanumeric, or even biometric. For instance, a passcode or PIN may be derived based on a user's fingerprint, voice print, voice recognition, etc.

Figure 1:
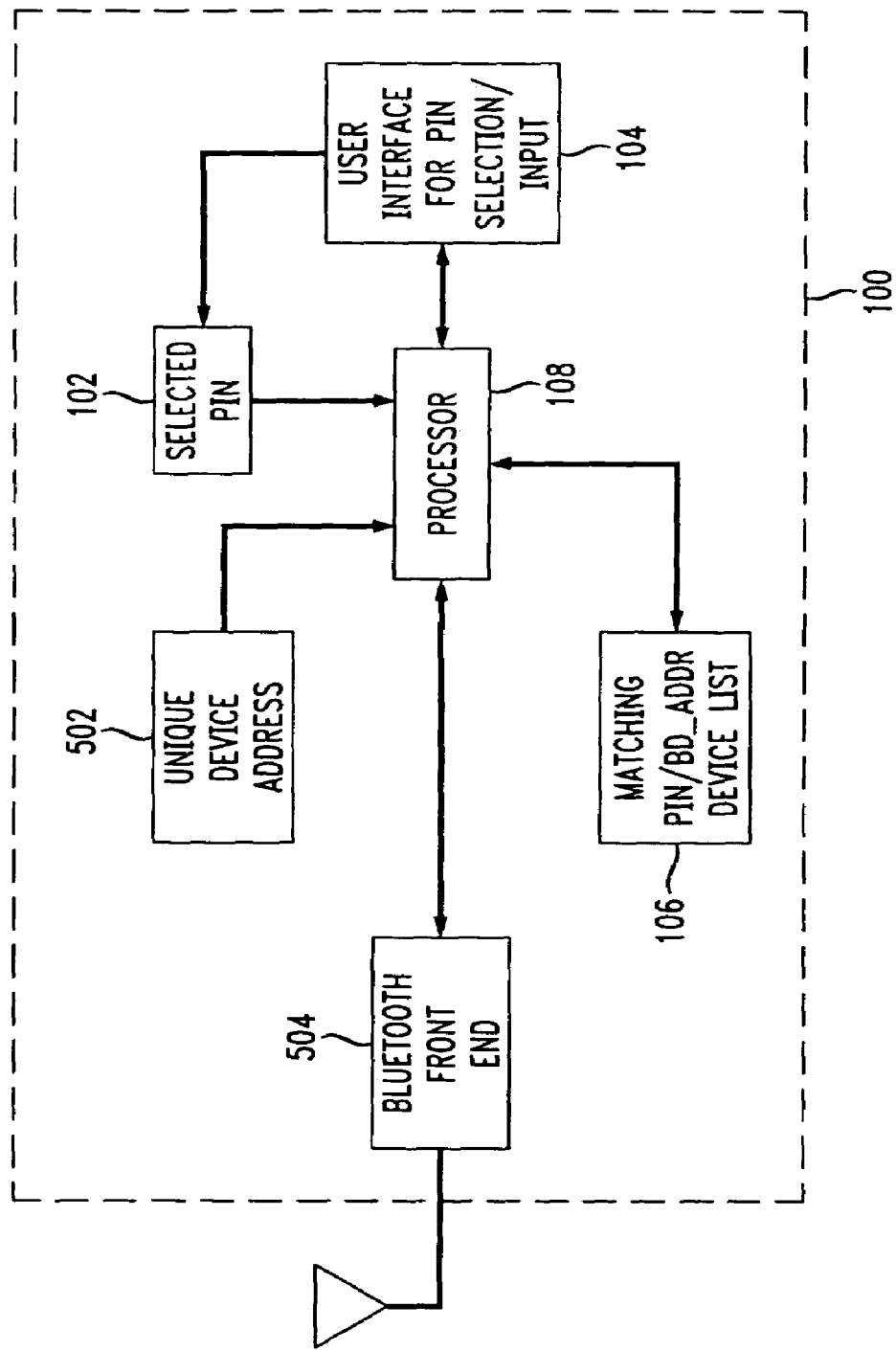
FIG. 1 depicts a BLUETOOTH piconet device including a user interface for passcode or PIN selection/input, and a matching PIN device list, in accordance with the principles of the present invention.

FIG. 1 depicts a BLUETOOTH piconet device including a user interface for passcode or PIN selection/input, and a matching PIN device list, in accordance with the principles of the present invention.

As shown in FIG. 1, a BLUETOOTH device 100 includes a BLUETOOTH front end 504, and a suitable processing device 108 (e.g., a microprocessor, a microcontroller, or a digital signal processor (DSP)). The BLUETOOTH device 100 also includes a unique 48-bit BD_ADDR device address 502. Importantly, the BLUETOOTH device 100 further includes a selected passcode or PIN 102, which in turn provides the basis for an automatic construction of a matching PIN/BD_ADDR device list 106. The BLUETOOTH device 100 also includes a user interface for PIN selection/input module.

BLUETOOTH devices each have a unique 48-bit address (BD_ADDR) that is used to define, as well as to allow for restricted communication with other BLUETOOTH devices. Pairing of BLUETOOTH devices occurs by setting up which BLUETOOTH device addresses can establish a connection with each other. Pairing of BLUETOOTH devices by inclusion of a list of BD_ADDR addresses of paired BLUETOOTH devices allows for many different devices to communicate with one another, and also restricts communication with those devices that do not have addresses that have been deemed acceptable or registered. It is this registration of acceptable BLUETOOTH device addresses that would be very cumbersome for users when they wish to establish a piconet connection between various devices. It will be very user-friendly for a device to allow for an input such as a common PIN that would be shared by all piconet members. Therefore, if a user wishes to add a new device or replace a BLUETOOTH device within a home or office, piconet pairing is established by mere entry or selection of the relatively short and simple passcode or PIN.

When this passcode is defined or entered by the user, the relevant BLUETOOTH device is then allowed to communicate with all other electronic devices sharing the same passcode or PIN, without the need for the user or manufacturer to individually select one or more paired devices.

Figure 2:
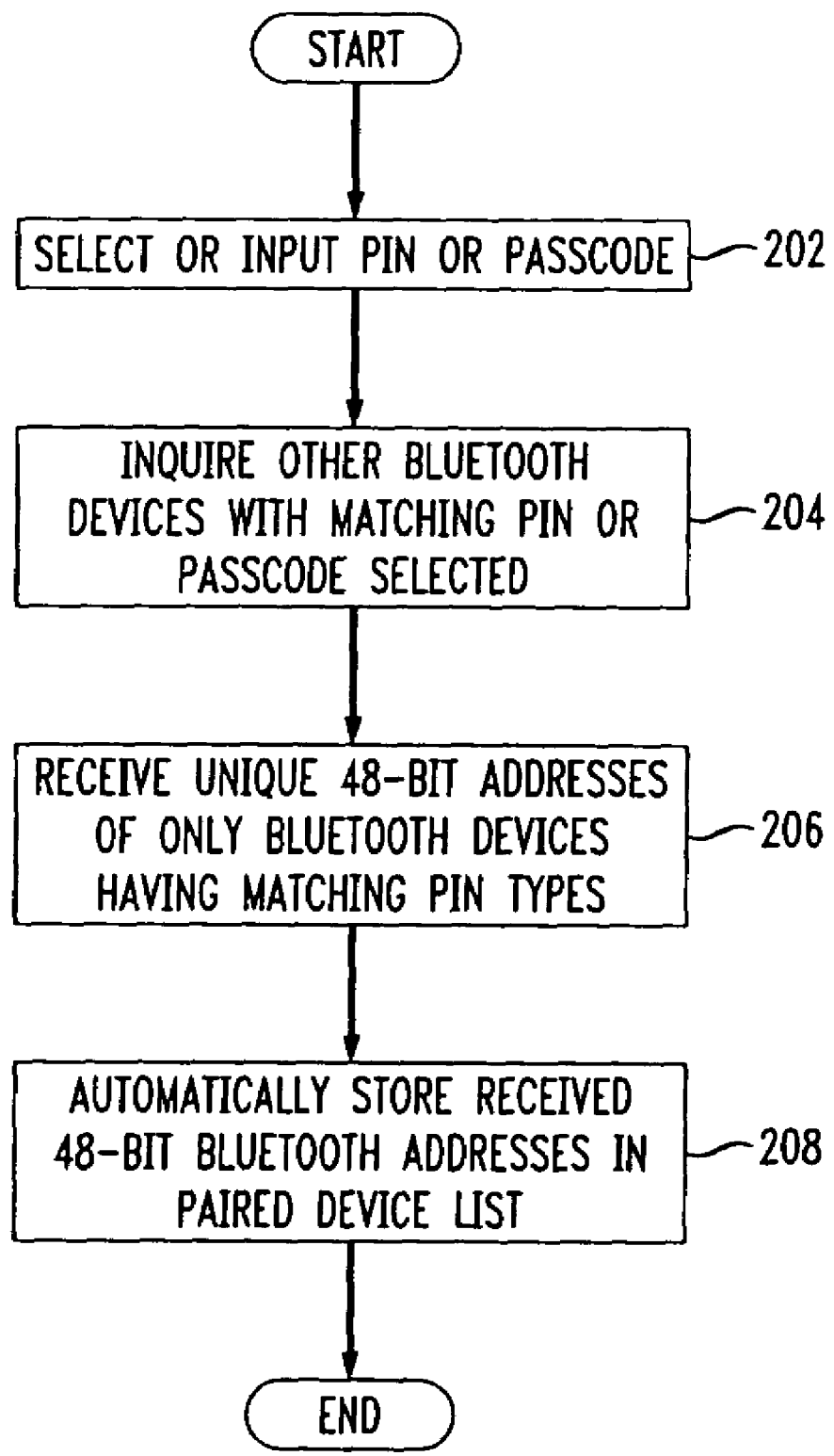
FIG. 2 shows an exemplary setup procedure for pairing a BLUETOOTH device with a piconet of other BLUETOOTH devices in accordance with the principles of the present invention.

FIG. 2 shows an exemplary setup procedure for pairing a BLUETOOTH device with a piconet of other BLUETOOTH devices in accordance with the principles of the present invention.

In particular, as shown in step 202 of FIG. 2, the user selects or manually inputs a desired PIN or passcode.

In step 204, the relevant BLUETOOTH device inquires to other BLUETOOTH devices within range to find other BLUETOOTH devices including matching PIN or passcodes.

In step 206, in response, unique 48-bit unique BD_ADDR addresses are received from only BLUETOOTH devices having matching PIN or passcode types.

In step 208, the received BD_ADDRs from other BLUETOOTH devices having matching PIN or passcodes are automatically stored in a paired device list, e.g., in the matching PIN/BD_ADDR device list 106 shown in FIG. 1.

The operations of steps 206 and 208 reduce and minimize network traffic as compared to conventional piconet systems wherein all BLUETOOTH devices may respond to an inquiry message.

Thus, in accordance with the principles of the present invention, an exemplary setup procedure asks a user to input a passcode or PIN, e.g., a short character code such as "MUSIC" for a pairing with all entertainment devices carrying the same "MUSIC" code, "APPL" for an automatic pairing with all appliance devices within the piconet, etc. Shorter passcodes or PINs are preferred, so as to be more easily entered by the user and/or remembered by the user for manual input.

Use of a passcode or PIN relieves the user of having to know the particular BLUETOOTH device address (or addresses) with which pairing is desired. This is particularly important in crowded applications including many BLUETOOTH devices. Thus, a user can be paired with other BLUETOOTH devices without ever knowing the specific 48-bit addresses of the other BLUETOOTH devices.

In a preferred embodiment, the BLUETOOTH device searches out all other BLUETOOTH devices and/or established passcodes or pins in the piconet, e.g., within the 10 m connection range. The BD_ADDR addresses of found BLUETOOTH device's and associated passcodes or PINS are received and validated by the requesting BLUETOOTH device. A choice of these established passcodes or PINS are displayed to the user for simple selection and storage of the associated BD_ADDR addresses of paired BLUETOOTH devices into a matching PIN device list.

Figure 3:
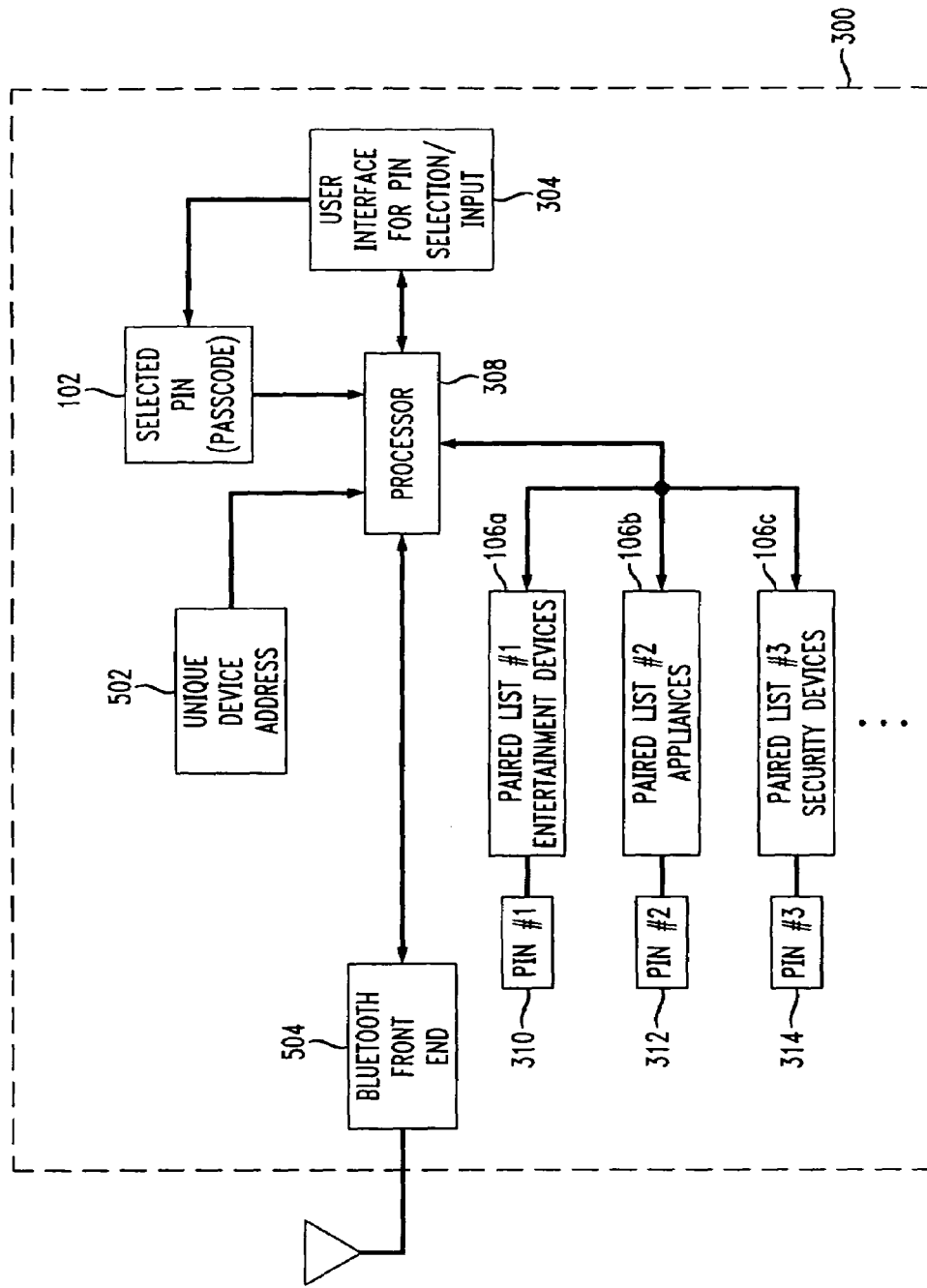
FIG. 3 depicts another embodiment of a BLUETOOTH piconet device including a user interface for passcode or PIN election/input, and a plurality of matching PIN device lists in a master device for download to slave devices, in accordance with the principles of the present invention.

FIG. 3 depicts another embodiment of a BLUETOOTH piconet device including a user interface for passcode or PIN selection/input, and a plurality of matching PIN device lists in a master device for download to slave devices, in accordance with the principles of the present invention.

In particular, as shown in FIG. 3, a master piconet device 300 includes a plurality of paired BD_ADDR lists 106a–106c, each associated with different PINs or passcodes 310–314, respectively.

In accordance with one embodiment, a slave piconet device entering the piconet controlled by the master piconet device 300 communicates a desired message to the master piconet device 300 requesting download of the paired list of BD_ADDR device addresses associated with a particular PIN or passcode. The particular PIN or passcode may be input by the user of the entering slave piconet device. The entering slave piconet device would automatically receive that paired list of BD_ADDR devices, and store the same in its matching PIN/BD_ADDR device list 106 (FIG. 1).

In another embodiment, a slave piconet device entering the piconet controlled by the master piconet device 300 may initially request a list of available or established PINs or passcodes 310–314 from the master piconet device 300, prompt the user of the slave piconet device to select for download one of the available PIN or passcodes 310–314, and then receive and store the downloaded list of BD_ADDRs in its matching PIN/BD_ADDR device list 106.

Figure 4:
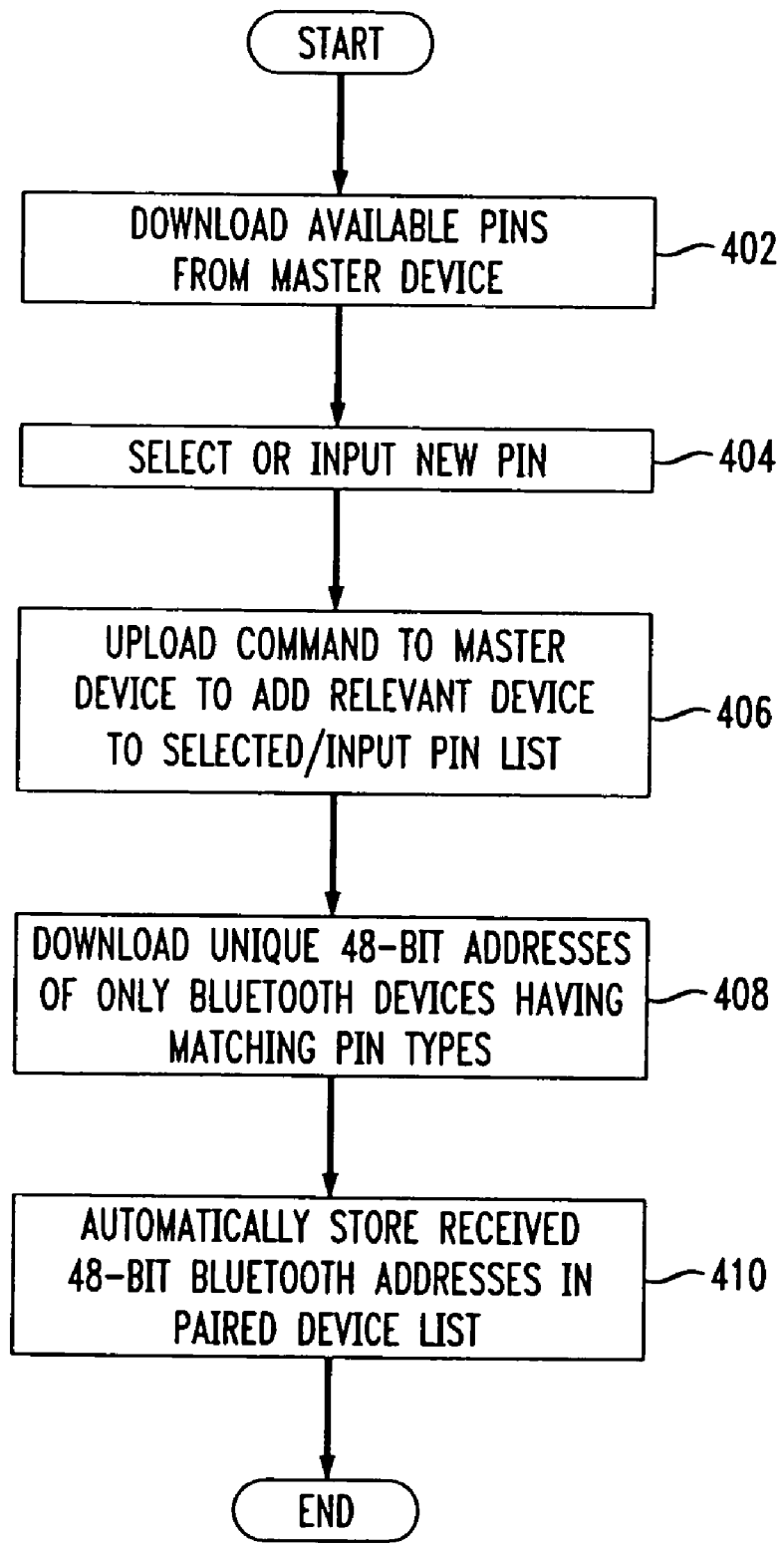
FIG. 4 shows an exemplary setup procedure for requesting a paired PIN list from a master BLUETOOTH device with a piconet of other BLUETOOTH devices, in accordance with another embodiment of the present invention.
Figure 5:
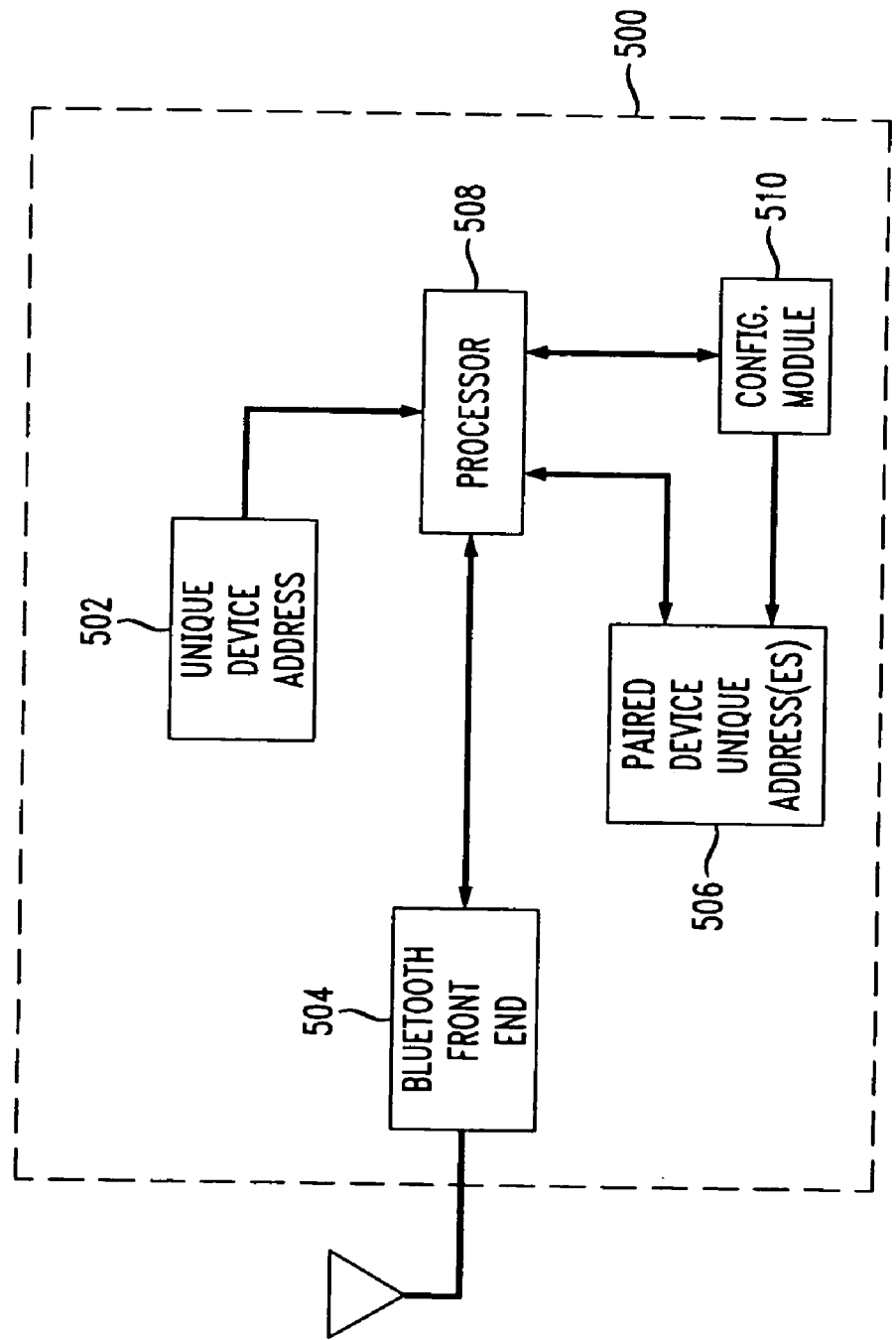
FIG. 5 depicts a conventional BLUETOOTH device.
Figure 6:
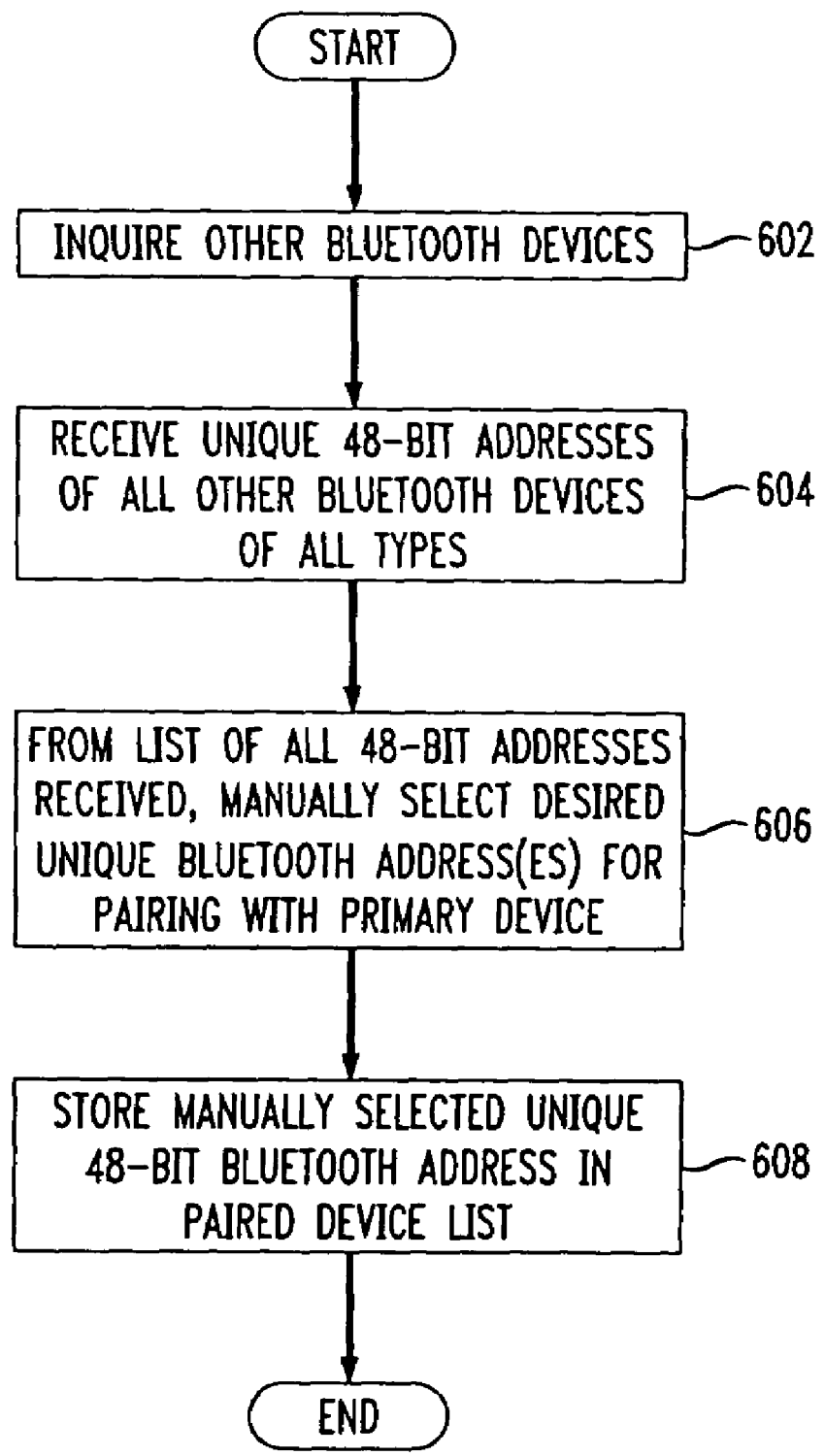
FIG. 6 shows a conventional configuration technique for automatically configuring a BLUETOOTH device with paired devices in a piconet.

FIG. 4 shows an exemplary setup procedure for requesting a paired PIN list from a master BLUETOOTH device with a piconet of other BLUETOOTH devices, in accordance with another embodiment of the present invention.

In particular, as shown in step 402 of FIG. 4, a list of available passcodes or PINs 310–314 are downloaded to an entering piconet device from a master piconet device 300 on the relevant piconet.

In step 404, a user of the entering piconet device selects or inputs one of the downloaded passcodes or PINs.

In step 406, the entering piconet device uploads an appropriate command to the master piconet device 300 an instruction to add the entering piconet device to the entering piconet devices paired PIN/BD_ADDR list 106 (FIG. 1).

In step 408, the master piconet device 300 downloads a list of unique 48-bit address of only those BLUETOOTH devices having matching PIN types to the entering piconet device.

In step 410, the received 48-bit BLUETOOTH addresses are automatically stored in appropriate RAM (volatile or non-volatile) corresponding to the matching PIN/BD_ADDR device list 106.

The use of passcodes or PINs provides a user-friendly feature to BLUETOOTH piconet devices, and enhances acceptance of BLUETOOTH piconet devices.

The use and implementation of a passcode or PIN in a BLUETOOTH piconet device also provides another level of security in that communications would not be permitted between devices not having a same passcode or PIN.

While the invention has been described with reference to the exemplary embodiments thereof, those skilled in the art will be able to make various modifications to the described embodiments of the invention without departing from the true spirit and scope of the invention.

What is claimed is:

1. A wireless piconet network device, comprising:
   a piconet front end;
   a unique address;
   a passcode or PIN selection module to allow a user to provide a passcode or PIN associated with at least one other wireless piconet network device within range of said wireless piconet network device, said passcode or PIN being distinct from an IEEE address; and
   a unique address retrieval module that uses said passcode or PIN to retrieve a unique address from said at least one other wireless piconet network device.

2. The wireless piconet network device according to claim 1, further comprising:
   a paired device unique address list, each unique address stored in said paired device unique address list being associated with said provided passcode or PIN.

3. The wireless piconet network device according to claim 2, wherein:
   said provided passcode or PIN is selectable from a list of established passcodes or PINs in a piconet corresponding to said wireless piconet network device.

4. The wireless piconet network device according to claim 1, wherein:
   said piconet front end conforms to BLUETOOTH standards.

5. The wireless piconet network device according to claim 1, wherein:
   said unique address is a 48-bit address.

6. The wireless piconet network device according to claim 1, further comprising:
   a plurality of paired device unique address lists, each of said plurality of paired device unique address lists being associated with one of a plurality of passcode or PINs.

7. A method of obtaining a unique address pairing between separate wireless piconet network devices, said method comprising:

singly entering a passcode or PIN into a first wireless piconet network device including a piconet front end, said passcode or PIN being distinct from an IEEE address; and providing to said first wireless piconet network device a unique address of a second wireless piconet network device only if a passcode or PIN in said second wireless pirconet network devices matches said single entered passcode or PIN;

wherein at least two piconet network devices in a common piconet network are associated with said single entered passcode or PIN.

8. The method of obtaining a unique address pairing between separate wireless piconet network devices according to claim 7, wherein:

said unique address is provided to said first wireless piconet network device from a second wireless piconet network device over said common piconet network.

9. The method of obtaining a unique address pairing between separate wireless piconet network devices according to claim 7, wherein:

said first wireless piconet network device conforms to a BLUETOOTH piconet standard.

10. The method of obtaining a unique address pairing between separate wireless piconet network devices according to claim 7, wherein:

said wireless piconet network device is a master BLUETOOTH device.

11. Apparatus for obtaining a unique address pairing between separate wireless piconet network devices, said method comprising:

means for singly entering a passcode or PIN into a first wireless piconet network device including a piconet front end, said passcode or PIN being distinct from an IEEE address; and means for providing to said first wireless piconet network device a unique address of a second wireless piconet network device only if a passcode or PIN in said second wireless pirconet network devices matches said single entered passcode or PIN;

wherein at least two piconet network devices in a common piconet network are associated with said single entered passcode or PIN.

12. The apparatus for obtaining a unique address pairing between separate wireless piconet network devices according to claim 11, wherein:

said means for providing provides said unique address to said first wireless piconet network device from a second wireless piconet network device over said common piconet network.

13. The apparatus for obtaining a unique address pairing between separate wireless piconet network devices according to claim 11, wherein:

said first wireless piconet network device conforms to a BLUETOOTH piconet standard.

14. The method of obtaining a unique address pairing between separate wireless piconet network devices according to claim 11, wherein:

said wireless piconet network device is a master BLUETOOTH device.

* * * * *